United States Patent [19]
Ward

[11] 3,835,522
[45] Sept. 17, 1974

[54] DISC BRAKE SPREADER
[76] Inventor: Marvin T. Ward, 918 Cohn St., Houston, Tex. 77007
[22] Filed: Jan. 12, 1973
[21] Appl. No.: 322,979

[52] U.S. Cl. .............................................. 29/239
[51] Int. Cl. ........................................... B23p 19/04
[58] Field of Search ............ 29/239, 267, 266, 401, 29/427; 254/104; 24/263 A, 263 LS

[56] References Cited
UNITED STATES PATENTS

| | | | |
|---|---|---|---|
| 971,438 | 9/1910 | Gillitt | 24/263 A |
| 2,043,140 | 6/1936 | Wilmesherr | 24/263 A |
| 2,575,412 | 11/1951 | Fechter | 24/263 A |
| 3,426,752 | 2/1969 | Laico | 29/239 |
| 3,654,689 | 4/1972 | Schwarz | 29/427 |

Primary Examiner—James L. Jones, Jr.
Attorney, Agent, or Firm—Roy H. Smith, Jr.

[57] ABSTRACT

The disc brake spreader is a piston retraction tool consisting basically of a pair of thin-plate jaws, shaped esentially like disc brake shoes, with one jaw fixed to a guide rod and the other jaw slidably mounted on the guide rod. The jaws each include an upwardly projecting portion through which they are connected by an expansion screw threaded through the immovable jaw and extending parallel to the axis of the guide rod. One end of the screw is journaled in the slidable jaw and secured thereto by a retainer which permits the jaws to move inwardly or outwardly by turning the screw.

3 Claims, 5 Drawing Figures

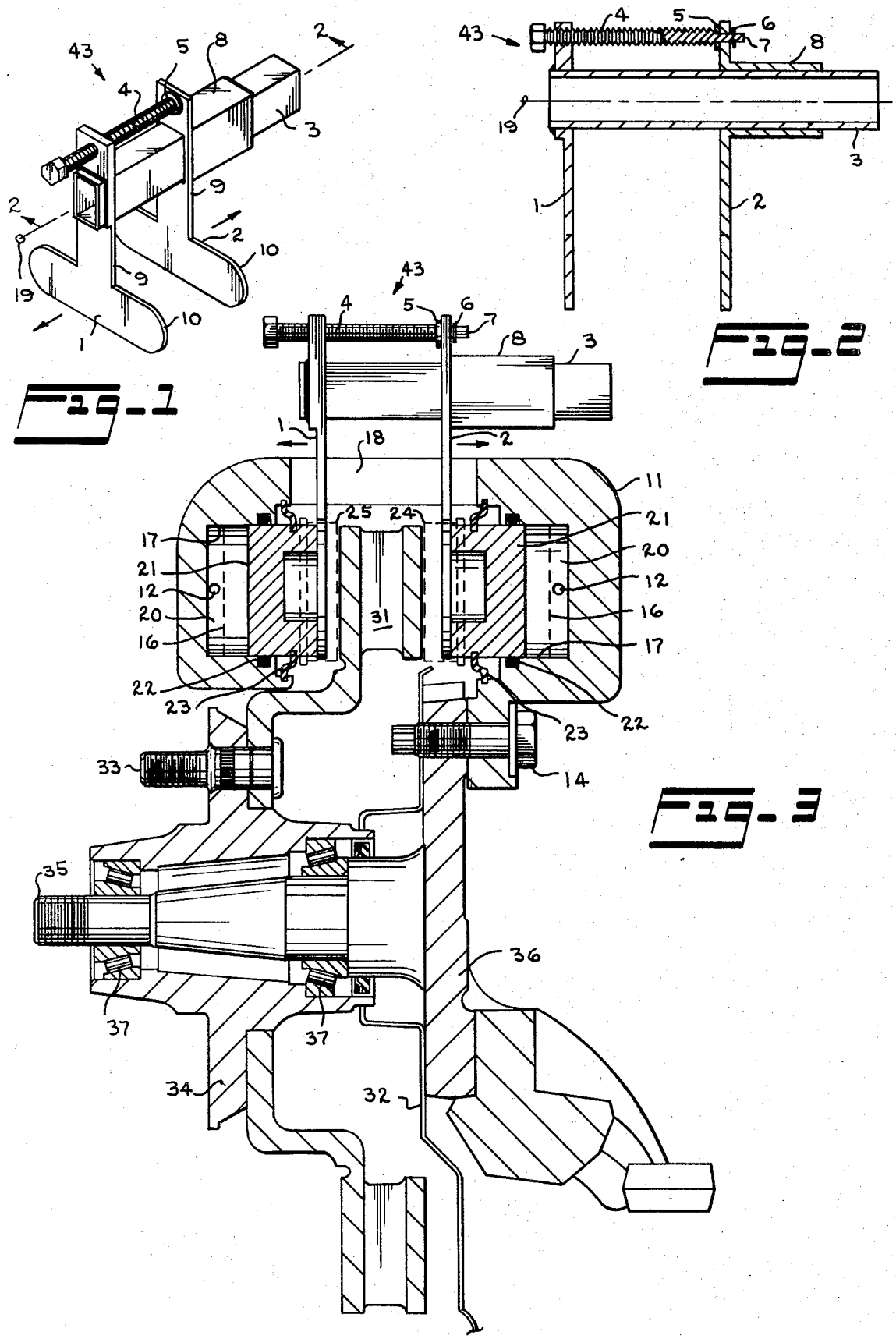

DISC BRAKE SPREADER

FIELD OF INVENTION

This invention relates to the need of automobile mechanics for a device to forcibly return automotive disc brake pistons to their fully retracted positions within their respective bores in the caliper body to allow new brake shoes to be installed without having to remove and reinstall the pistons.

PRIOR ART

The prior art in the field of the present invention consists mainly of devices which will not do a satisfactory job of piston retraction when the pistons are stuck tightly in their respective bores. One such device is a scissors type spreader device which will not stay in position when sufficient pressure is applied to break loose tightly stuck pistons. Other devices are used to retain pistons in their bores, but have no means for applying a retraction force. Conventional tools now in use require either two men to operate them, or they may cause damage to components, especially the disc face, as by prying with screwdrivers.

OBJECTS OF THE INVENTION

The principal object of the present invention is to provide automotive mechanics with a tool which will easily and quickly cause automotive disc brake pistons to return to their fully retracted positions within their respective bores in the caliper body when they are stuck or prove difficult to retract. Such retraction is necessary in changing brake shoes which have worn thin and the pistons which force the shoes into contact with the brake disc are protruding from their bores. Such protrusion occurs because the disc brake system includes a wear-compensation automatic adjustment feature. As the shoes (or, more accurately the brake shoe linings) wear even thinner, this feature causes the pistons to protude from their bores toward the shoes to compensate for shoe wear.

A second object is to provide the mechanic with a tool which can be easily installed or removed from the disc brake system by a single workman.

A third object is to provide a separable jaw tool on which the jaws forcibly open wider, away from one another, by operation of an expansion screw acting on the jaws, the jaws in turn acting on the actuating pistons of a hydraulic disc brake to force them back into their bores in the caliper body (brake body).

A fourth object is to provide such a tool with an expansion screw acting parallel to the axis of the cylinder bores to avoid rotation of the caliper body, thus avoiding a twisting strain on the hydraulic fluid line, particularly in those instances where the caliper body must be removed from the hub but does not require disconection from the hydraulic line.

A fifth object of the present device is to provide such a tool which will work on disc brake systems which allow removal of the brake shoes without removal of the caliper body from the brake disc, and which will also work on the type of disc brake system which requires removal of the caliper body from the hub but not from the hydraulic line in order to replace worn brake shoes.

A sixth object of the present invention is to provide a disc brake tool with thin but strong jaws which can be inserted between disc and pistons to utilize the space left after removal of the worn shoes, the jaws being of such configuration as to accommodate either single piston systems or multiple piston systems.

BREIF DESCRIPTION OF THE DRAWING FIGURES

In the accompanying drawing which constitutes a part of the present application:

FIG. 1 is a prespective view of a preferred embodiment of the invention, shown apart from any brake system and with the jaws of the device partially opened.

FIG. 2 is a longitudinal cross section of the device of FIG. 1, as indicated by the sectioning lines and arrows labeled "2—2" in FIG. 1.

FIG. 3 is a radial section through a wheel axle and disc brake, showing the embodiment of FIG. 1 in use with a typical disc brake system including a hub, disc, spindle, and steering knuckle assembly, in which figure the worn shoes and their actuating pistons have been removed. The needed positioning of the thicker new shoes is shown in phantom, with the device of the invention installed in position to return the pistons to their retracted posture.

Figure 4:
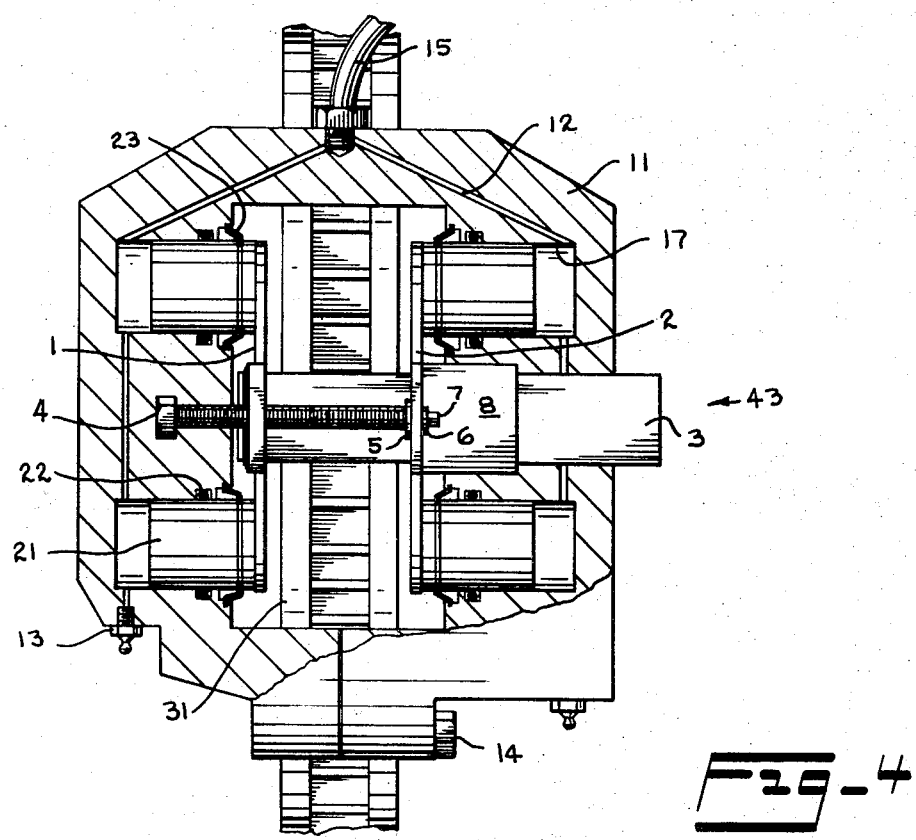

FIG. 4 is a tangential cross section of a typical disc brake system mounted on the hub of an automobile, showing the FIG. 1 embodiment in place and the old shoes removed.

Figure 5:
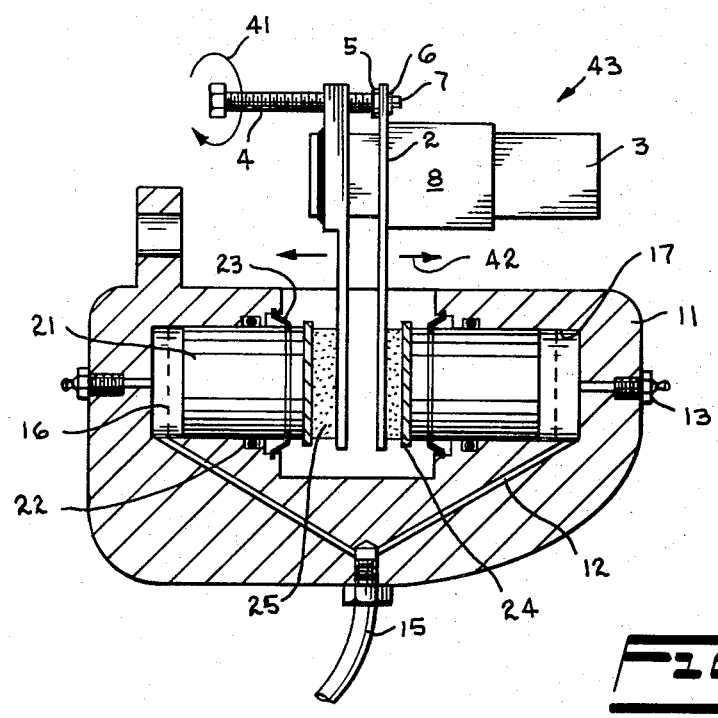

FIG. 5 is a vertical longitudinal section of a typical disc brake caliper after removing it from an automobile and inverting it. It is shown with new shoes installed and the FIG. 1 imbodiment in place, ready to return the pistons to their fully retracted position.

DETAILED DESCRIPTION OF THE DRAWING

FIG. 1 is a perspective view of a preferred embodiment 43 of the present invention, having a T-shaped immovable jaw 1 fixedly attached to a guide rod 3 and a slidable jaw 2, also shaped like the letter "T," secured to a member 8 which is slidably mounted on guide rod 3. The movement of the slidable jaw 2 is controlled by an expansion screw 4 which is screwed through a threaded opening in the upwardly projecting center portion 9 of immovable jaw 1 and is journaled in movable jaw 2 (see FIG. 2) in such a way as to translate the slidable jaw 2 toward or away from jaw 1 when screw 4 is turned. The jaws 1 and 2 are substantially identical plates which include a base or crossbar portion 10 shaped like an automobile disc brake shoe, so that when inserted into a disc brake caliper they will bear against the shoes or pistons with the maximum of contact area, whether the brake system uses one or more pistons. The purpose of the screw 4 is to cause jaw 2 to move relative to jaw 1, in a direction parallel to the axis 19 of guide 3, this direction also being parallel to the lines of action of the hydraulic pistons which actuate the brake shoes. In operation the screw causes jaws 1 and 2 to move away from each other, as indicated by the arrows.

FIG. 2 is a longitudinal cross section of the device 43 as indicated by the lines and arrows "2—2" of FIG. 1. It shows the reduced diameter end step 7 of expansion screw 4 extending through an opening in jaw 2 with a sliding fit and joining its threaded body at a shoulder equipped with a thrust washer 5 to distribute thrust to the face of slidable jaw 2, and a retainer ring 6 to secure the screw to slidable jaw 2. Thus the screw 4 is both journaled in jaw 2 and serves as the means for moving jaw 2 relative to jaw 1.

FIG. 3 shows a substantially vertical cross section of a disc brake assembly of the type which will allow shoe replacement on the automobile, and is shown on the automobile with its attached components in place, only the wheel and worn shoes having been removed. The embodiment 43 of the present invention is shown in position ready to be operated. The steering knuckle 36 supports the spindle 35 which in turn supports hub 34 by means of bearings 37. The hub 34 is fastened to the braking disc or rotor 31 by wheel stud mounting bolts 33 in such a way as to rotate when the wheel (not shown) and its hub 34 rotate. Splash shield 32 protects braking disc 31 from dust and splashed water. The caliper 11 is fastened to the steering knuckle 36 by bolt 14. Pistons 21 operating in cylinders 20 move inwardly toward the disc 31 under the influence of hydraulic pressure, pushing against shoes 24 and their linings to provide a clamping action on the disc 31 to stop the vehicle when the brakes are actuated.

The pistons 21 are shown protruding from their bores to an extent caused by the wear of old shoes (not shown in FIG. 3). The old shoes have been removed in the figure for clarity, and the new shoes are shown in dashed lines at 24 and 25 to show that the pistons 21 need to be returned to their retracted positions 16 to allow installation of shoes with thicker linings.

Reference numeral 12 indicates the end of the hydraulic fluid passageway supplying hydraulic fluid when braking. The pistons 21 are sealed by seals 22 and protected form dust by dust boots 23. A spreader 43 of the present invention is shown installed in position to forcibly return pistons 21 to their retracted positions 16 by applying pressure through expansion screw 4. Jaws 1 and 2 have been inserted through the top opening 18 of caliper body 11 and bear in opposite directions against the shoe ends of pistons 21. By connecting a wrench to the head of expansion screw 4 and rotating it in the proper direction, jaws 1 and 2 are caused to spread apart from one another to force pistons 21 deeper into their cylinders 20 until they reach their retracted positions 16, thus making room for the new shoes 24 and 25 shown in phantom.

FIG. 4 is a tangential section (using the wheel spindle axis as the line of reference) of a multiple piston disc brake assembled with the braking disc 31 of an automobile. The retainings shield of the disc brake has been removed to provide access to pistons 21, and all brake shoes have also been removed. It is substantially the same type as shown in FIG. 3. The spreader 43 of the invention is shown with jaws 1 and 2 inserted from the top and bearing against all four pistons 21 at the same time. Shown also are hydraulic line 15 and bleeder valves 13 with their interconnecting passageways 12 in caliper body 11.

FIG. 5 shows a longitudinal cross section of a multiple piston caliper 11 similiar to those of FIGS. 3 and 4 but differing therefrom in that the caliper 11 of FIG. 5 must be removed from the vehicle in order to remove and replace shoes 24 and 25. It is shown removed from the steering knuckle 36 (not shown) but still attached to the vehicle by hydraulic line 15. The shoes with their linings are shown in place at this time to illustrate that the tool 43 can be used when shoes are present if caliper 11 is removed from its usual position straddling the braking disc on the vehicle.

When the expansion screw 4 is turned as illustrated by arrow 41, the movable jaw 2 will move away from the immovable jaw 1, (arrows 42), causing the jaws to push pistons 21 into their retracted positions 16 and forcing the hydraulic fluid in the blind ends of cylinders 20 to back up in passageways 12 and hydraulic line 15 and out the master cylinder (not shown), or out one of the bleeder valves 13. This will leave enough room between the shoe linings 24 and 25 to accomodate the thickness of the braking disc 31 (not shown in FIG. 5) when the entire unit is installed with the shoes 24 and 25 on both sides of the disc 31 (see also FIG. 3).

Refering to FIGS. 3, 4, and 5, it will be apparent that new shoes 24 with their thick, unworn linings can not be installed with pistons 21 protruding as shown in FIG. 3, and that pistons 21 must be returned to their retracted positions 16 before installing new shoes because of the limited space between pistons 21 and disc 31. Further these figures show that the spreaders of the present invention can be inserted into the different types of calipers to accomplish the same piston-spreading function. No attempt has been made to show every type of disc brake system, but the universality of the invention of beleived to be apparent.

ADVANTAGES OF THE INVENTION

The present invention has movable jaws mounted to remain in place without being forcibly held, whereas presently available devices will sometimes slip out of position. By virtue of its design it is a strong tool, not likely to failure under load. The present invention utilizes an expansion screw to provide a powerful means of applying pressure to actuating pistons of a disc brake, to overcome the sometimes high resistance met in returning the pistons to their retracted positions. The present invention is a simple device of inexpensive welded construction, not requiring any precision machining or workmanship. It is easy to operate, requiring rotation of only one screw. It will operate on different types of brake systems with equal ease.

The present invention requires no special training to operate. It allows the mechanic to replace worn brake shoes at less expense to the customer, by returning the pistons to their retained positions without a complete tear-down of the whole brake system. It will not cause twisting of the hydraulic line, as some present devices do, when the caliper body is partially removed. Only one person is required to operate it, as opposed to use of some conventional, non-specialized tools, which may require two operators.

What is claimed is:

1. A disc brake spreader comprising a pair of thin, T-shaped jaws each having a crossbar generally contoured like a disc brake shoe and a center bar joined to and extending upwardly from the crossbar, a guide rod having one end secured to the center bar of one of the jaws and extending through an opening in the other so that said pair of jaws are disposed parallel to one another and with the second slidable with respect to the other on the guide rod, and screw means connected to and cooperating with both said jaws to adjust the spacing therebetween, said screw means including a screw elongated along its own axis and having a handle end and an opposed end, said handle end being threaded through the fixed jaw of the pair so that rotation of the screw causes it to be axially translated relative to such jaw, said opposed end of the screw being journaled in and secured to said slidable jaw, whereby rotation of the screw causes movement of the slidable jaw along the axis of the screw, said screw means being fitted to the center bars of the pair of jaws well above the crossbars thereof to avoid in use interference with any part of the disc brake or wheel structure on which it is mounted.

2. A disc brake spreader comprising a pair of thin, parallel plate jaws, each said jaw having a base or crossbar portion and an upright or center bar portion integrally secured to and extending upwardly from the crossbar, a guide member secured to one of the jaws and extending through an aperture in the other in slidable relationship therewith, and screw means connected to and cooperating with the pair of jaws to adjust the spacing between them, said crossbars of the jaws having the general shape and dimensions other than thickness of a disc brake shoe, said screw means including a screw elongated along its own axis and having a handle end and an opposed end, said handle end being threaded through the fixed jaw of the pair so that rotation of the screw causes it to be axially translated relative to such jaw, said opposed end of the screw being journaled in and secured to said slidable jaw, whereby rotation of the screw causes movement of the slidable jaw along the axis of the screw, said screw means being fitted to the center bars of the pair of jaws well above the crossbars thereof to avoid in use interference with any part of the disc brake or wheel structure on which it is mounted, said handle end of the screw terminating in a shape adapted for gripping and rotation by a wrench, crank or similar rotating tool.

3. A brake spreading tool comprising in combination a pair of thin plate jaws disposed in parallel relationship and adjustably spaced apart from one another, guide means connected to and extending between the jaws to permit relative movement between them while maintaining said parallel relationship, and gap adjusting means connected to said jaws for moving them relative to each other to spread them apart while in contact with parts of a disc brake which resist such spreading movement, each said jaw having a transverse portion having the general shape and dimensions of a disc brake shoe, whereby the tool may be inserted in a disc brake with the transverse portions of the jaws spanning the disc and facing either the brake shoes or the hydraulic pistons which exert force on the shoes, and the gap adjusting means may be manipulated to retract said pistons, said pair of jaws having upright and parallel portions integrally secured to said transverse postions, said guide means and gap adjusting means being attached to and extending between said upright portions of the jaws at spaced distances above the transverse portions of the jaws to avoid interference with the disc brake and wheel structure on which it is mounted, and said gap adjusting means is a screw threaded through one jaw and with one end both journaled in and secured to the other jaw, the unjournaled end of the screw terminating in a head adapted to be gripped and rotated by a wrench or similar tool.

* * * * *